United States Patent [19]

Zochowski

[11] Patent Number: 4,525,872

[45] Date of Patent: Jun. 25, 1985

[54] AMPLIFIER

[76] Inventor: John S. Zochowski, 118 Palmer St., Jamestown, N.Y. 14701

[21] Appl. No.: 508,012

[22] Filed: Jun. 27, 1983

[51] Int. Cl.[3] .............................................. H04B 1/08

[52] U.S. Cl. .................................. 455/344; 455/348; 455/351; 181/179; 181/185; 181/199

[58] Field of Search ............... 455/344, 349, 347, 348, 455/350, 351; 181/175, 177, 179, 185, 192, 198, 199; 179/6.12; 381/88, 90, 150, 155

[56] References Cited

U.S. PATENT DOCUMENTS

| | | | |
|---|---|---|---|
| 3,249,873 | 5/1966 | Whittemore, Jr. et al. | 455/350 |
| 3,748,583 | 7/1973 | Anderson et al. | 455/351 |
| 3,805,915 | 4/1974 | Payne | 455/351 |
| 4,299,344 | 11/1981 | Yamashita et al. | 455/351 |

*Primary Examiner*—Jin F. Ng

*Attorney, Agent, or Firm*—Ralph Hammar

[57] ABSTRACT

An accessory for mounting on the receiver of a personal paging system. The receiver is normally worn below ear level and the accessory increases the sound of the paging signals reaching ear level.

2 Claims, 5 Drawing Figures

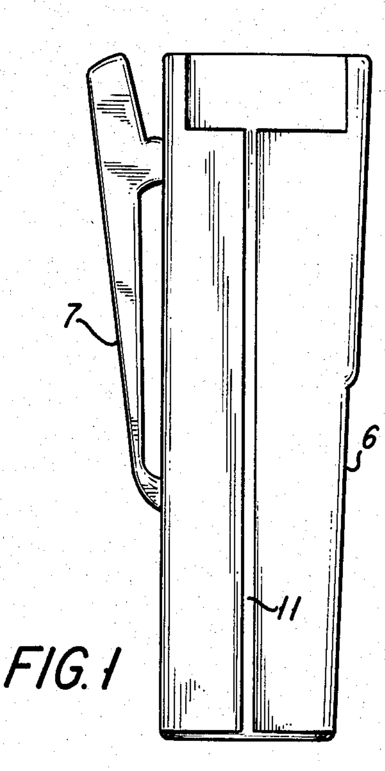
FIG. 1
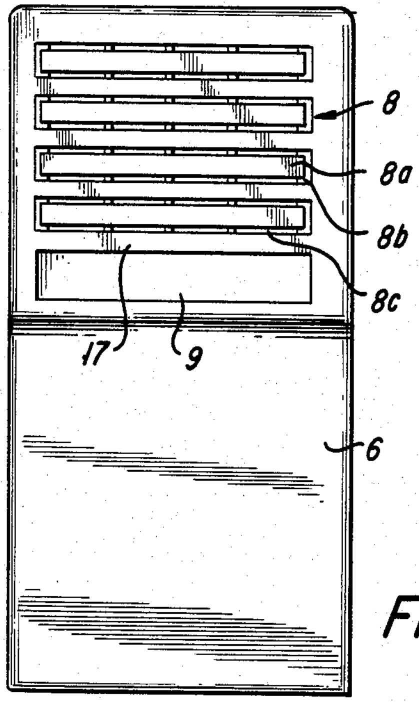
FIG. 2
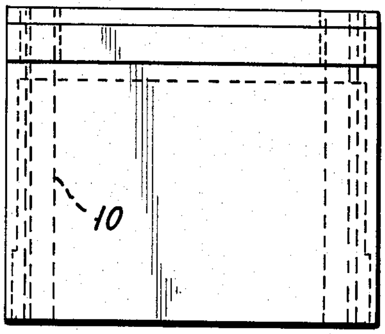
FIG. 5
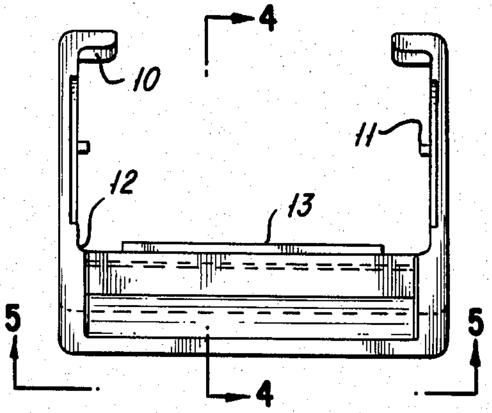
FIG. 3
FIG. 4
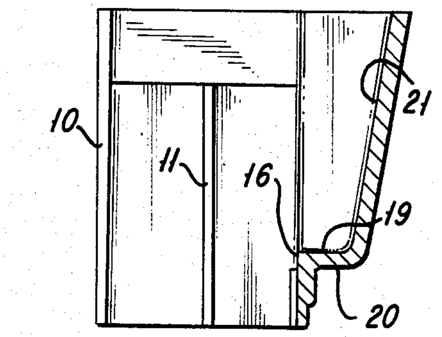

AMPLIFIER

This invention is intended to improve the operation of receivers for personal paging systems by mechanically amplifying the paging signal. This is important because the receivers are often worn in noisy environments where the paging signal might go unnoticed.

In the accompanying drawing,

FIG. 1 is an edge elevation of a personal paging receiver,

FIG. 2 is a front elevation of the receiver taken from the side which is normally presented away from the body of the person wearing the receiver, FIG. 3 is a top view of the device for mechanically amplifying the paging signal emitted by the receiver, FIG. 4 is a section on line 4—4 of FIG. 3, and FIG. 5 is an elevation of FIG. 3 looking in the direction of arrow 5.

This invention is shown applied to a Motorola MINITOR paging receiver having a case 6 which is of generally rectangular cross section in planes perpendicular to its longitudinal axis and is slightly thicker at the top than the bottom, as shown in FIG. 1. The case is ordinarily worn below ear level, i.e. carried in a shirt pocket or worn on a belt. A spring clip 7 prevents accidental removal from the belt. Within the case is a radio receiving apparatus and a speaker for emitting a paging signal. The speaker is adjacent the upper end of the case and radiates through a grille 8 formed in the case. The grille has bars 8*a* surrounded by grooves 8*b* in the bottom of which are slots 8*c*. Below the grille is a shallow rectangular recess 9 in the bottom of which is the name of the receiver or other identification. The outer surface of the grille 8 is flush with the adjacent surface of the case.

In the particular receiver shown, the paging signal has an intensity of about 79 decibels. While this is adequate for many purposes, there are some areas where additional sound is required for reliable paging. Substantially 10 decibels additional signal intensity is obtained by the attachment shown in FIGS. 3, 4 and 5.

The sound amplifying device which is made of one of the impact resistant plastics is an open ended member of generally rectangular cross section which slides onto (telescopes over) the case 6 from bottom to top. When assembled, the inwardly extending flanges 10 engage the back wall of the case, ribs 11 engage grooves 11*a* in the sidewalls of the case, and shoulders 12 engage the corners of the front wall of the case. In this position, an inwardly extending rectangular projection 13 at the lower end of the front wall of the attachment snaps into the shallow depression 9 in the case and blocks further upward movement of the attachment relative to the case. A surface 16 closely fits the lowermost portion 17 of the grille. The upper surface 19 of the offset section 20 of the attachment is in generally direct continuation of the lowermost sound emitting groove 8*b* of the sound transmitting grille 8 of the receiver. Sound flowing outwardly through the grille is guided upwardly and outwardly by the inclined surface 21 at the front of the amplifying attachment. The outward flare of the surface 21 is effective in amplifying the received signal. Angles greater than or less than the particular angle illustrated produce less amplification.

I claim:

1. An accessory for a personal paging device adapted to be worn below ear level by a user, said device having a case of generally rectangular cross section containing radio receiving apparatus including a speaker for emitting an audio paging signal and a grille in an upper part of an outer side wall of the case through which the signal is emitted, said accessory comprising an open ended member of generally rectangular cross section slidably fitting over said case, the lower end of said member fitting tightly against the said outer side wall below and adjacent said grille, and said member having a wall opposite and spaced outwardly from said grille diverging outwardly and upwardly at an acute angle to said outer side wall for increasing the intensity of the sound at ear level of the paging signals emitted from the upper end of said accessory.

2. An accessory for a personal paging device adapted to be worn below ear level by a user, said device having a case of generally rectangular cross section containing radio receiving apparatus including a speaker for emitting an audio paging signal and a grille in an upper part of an outer side wall of the case through which the signal is emitted, said accessory comprising an open ended member of generally rectangular cross section slidably fitting over said case, the lower end of said member fitting tightly against the said outer side wall below and adjacent said grille, and said member having an open topped upper section opposite and offset outwardly from said grille and diverging upwardly at an acute angle for increasing the intensity of the sound at ear level of the paging signals emitted from the upper end of said accessory.

* * * * *